United States Patent Office
3,310,513
Patented Mar. 21, 1967

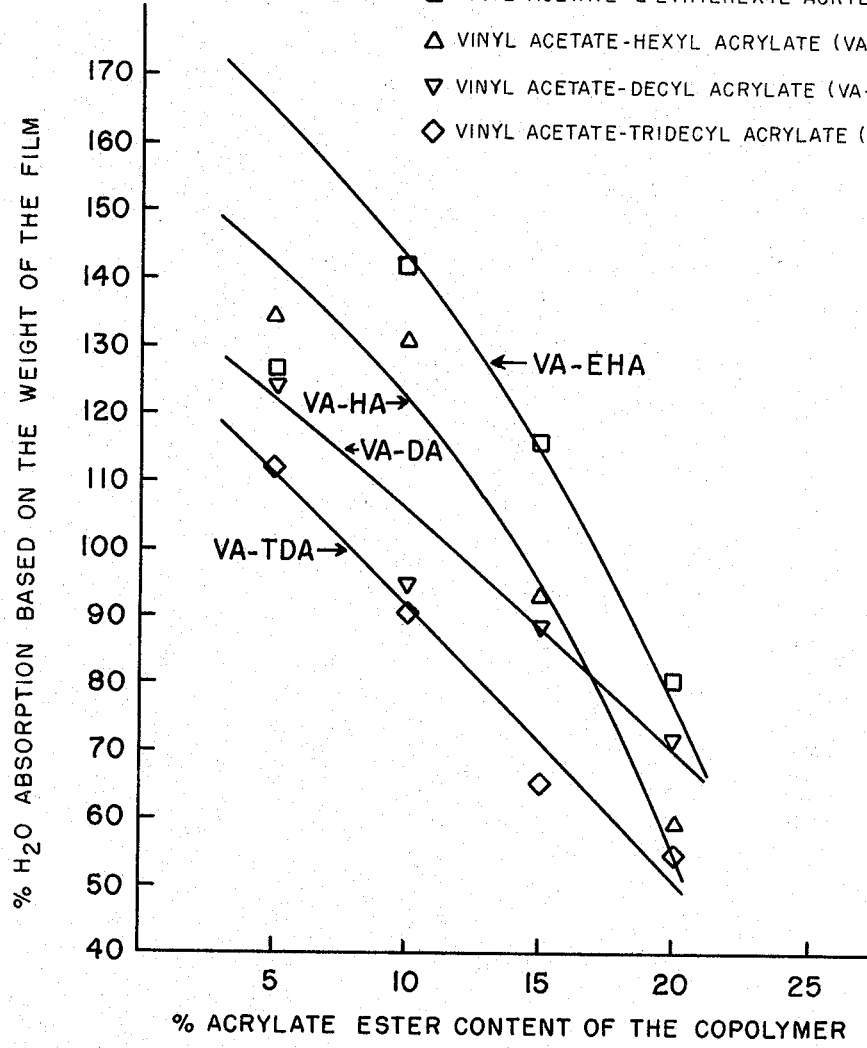

3,310,513
COATING COMPOSITIONS COMPRISING POLYMERS OF ACRYLIC ESTERS
Walter P. Barie, Jr., Pittsburgh, and Norman W. Franke, Penn Hills Township, Allegheny County, Pa., assignors to Gulf Research & Development Company, Pittsburgh, Pa., a corporation of Delaware
Filed Aug. 13, 1962, Ser. No. 216,660
6 Claims. (Cl. 260—29.6)

This invention relates to coating compositions and, in particular, to coating compositions which have unexpectedly low brittle points and water absorption qualities.

Polymers of certain acrylic esters, for example, polymers of 2-ethylhexyl acrylate, are used commercially in various coating compositions, for example, in water-base paints, as adhesives, and as paper, textile and leather coatings. In many low temperature applications, it is important that the polyesters be capable of forming films which are flexible at low temperatures and which have low rates of water absorption. Increasing the length of the side-chain of the normal alcohol acrylates to a maximum of eight carbon atoms tends to stoften or plasticize the polymers made from these acrylates. It is reported (see Monomeric Acrylic Esters by E. H. Riddle, Reinhold Publishing Corporation, 1954, page 60), that isomeric variations within the alcohol group also have a marked influence on the characteristics of the polymers, branching of the alcohol raising the brittle point. It is also known that as the carbon number in the alkyl group of normal alkyl acrylates increases above eight, the brittle point of the homo polymers formed from these high carbon number normal alkyl acrylates increases sharply. Formerly, therefore, it was believed that the homo and copolymers of alkyl acrylates having 10 carbon atoms or more in the alcohol portion and particularly the homo and copolymers of branched-chain alkyl acrylates having 10 carbon atoms or more in the alcohol portion were unsuitable for coating compositions where qualities of low brittle point were necessary or desirable. It has now been found that coating compositions can be prepared which are capable of forming films which have unexpectedly low brittle points in addition to low water absorption qualities from selected polymers of specific mixtures of normal and branched-chain alkyl acrylates and methacrylates.

In accordance with the invention, it has been found that compositions containing a polymer comprising an acrylic ester polmer having an average molecular weight of at least 2000 and a brittle point of less than −20° C., substantially each alternate carbon atom in the acrylic ester polmer chain having dependint therefrom a first organic ester radical having the general formula:

where R is a saturated alkyl radical having between 10 and 16 carbon atoms and a second radical selected from the group consisting of hydrogen and $CH_3$, and where, in said acrylic ester polymer, at least one-half of said R radicals have a branched-chain structure and also an inert volatile carrier, are excellent coating compositions. In one preferred embodiment of this invention the acrylic ester monomers are prepared by the reaction of acrylic or methacrylic acid with mixtures of alcohols, at least 50 weight percent of which are branched-chain, having between 10 and 16 carbon atoms per molecule which are produced by the hydroformylation and subsequent hydrogenation of olefins having between 9 and 15 carbon atoms per molecule. In yet another preferred embodiment of this invention, the coating compositions comprise an inert volatile carrier and a copolymer of a high molecular weight acrylic ester having the general formula:

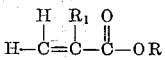

where R is a saturated alkyl radical having between 10 and 16 carbon atoms and $R_1$ is selected from the group consisting of H and $CH_3$, and a low molecular weight vinyl compound having the general formula:

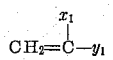

where $x_1$ is selected from the group consisting of hydrogen and a saturated aliphatic radical having between one and four carbon atoms and $y_1$ is selected from the group consisting of $—OOCR_2$ where $R_2$ is a saturated aliphatic radical having one and four carbon atoms; $—COOR_2$ where $R_2$ is as defined above; —Cl; phenyl; and mono- and disubstituted phenyl where the substituents are selected from the group consisting of methyl and chloro, said copolymer having a weight average molocular weight of at lease 2000 and where in said copolymer at least one-half of said R radicals have a branched-chain structure.

The selected acrylic ester polymers which are utilized to form the compositions of this invention have the general formula:

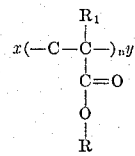

wherein $n$ is an integer such that said arcylic ester polymer has an average molecular weight of at least 2000, $R_1$ is selected from the group consisting of hydrogen and $CH_3$; R is a saturated alkyl radical having between 10 and 16 carbon atoms; $x$ and $y$ can be the same or different and are selected from the group consisting of hydrogene,

where R is as defined above, and the free radical fragments of the polymerization catalyst as hereinafter defined; and in said acrylic ester polymer at least one-half of said R radicals have a branched chain structure.

When $R_1$ is $CH_3$ and R is an alkyl radical having 16 carbon atoms and the acrylic ester polymer has an average molecular weight of 2000, $n$ has a value of about six. The value for $n$ can vary between about six and about 2000, or higher, with preferred values depending upon the preferred acrylic ester monomer and the preferred molecular weight of the product.

The selected acrylic ester polymers which are utilized to form the compositions of this invention have a weight average molecular weight of at least 2000. The preferred weight average molecular weight of the selected acrylic ester polymers is between 2000 and 400,000 with more preferred weight average molecular weights between 10,000 and 100,000. The weight average molecular weight of the polymers are measured by the method of intrinsic viscosity which is described fully in "Principles of Polymer Chemistry," Paul J. Flory, page 308, Cornell University Press (Ithaca, N.Y.), 1953.

The selected acrylic ester polymers of this invention are also characterized by their unexpectedly low brittle points. Thus, the selected acrylic ester polymers of this invention have brittle points between −20° and −50° C.

The acrylic ester polymers of this invention are also characterized by a branched structure in the alcohol portion of the dependent ester radicals. This alcohol portion of the monoester is represented in the structural formula above by R. It is preferred that all of the R radical substituents which represent the alcohol portion of the ester monomers have to be branched chain structure, and still more preferred that the R radicals have at least two branches. In order to produce the coating compositions of this invention which are capable of forming films which have brittle points of less than −20° C., it has been found that at least one-half of the R radical substituents must have a branched chain structure. It is preferred that at least 80% of the R radicals have a branched chain structure and still more preferred that substantially all of the R radicals have a branched chain structure.

The high molecular weight acrylic ester monomers defined above are also suitably employed for the preparation of improved copolymer emulsions and solutions useful as coating compositions. The high molecular weight acrylic ester monomers are suitably copolymerized with low molecular weight vinyl-type monomers or mixtures thereof defined by the general formula:

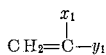

where $x_1$ is selected from the group consisting of H and a saturated aliphatic radical having between one and four carbon atoms and $y_1$ is selected from the group consisting of —OOCR$_2$ where R$_2$ is a saturated aliphatic radical having between one and four carbon atoms; —COOR$_2$ where R$_2$ is as defined above; —Cl; phenyl; and mono- and disubstituted phenyl where the substituents are selected from the group consisting of methyl and chloro. Specific examples of suitable vinyl monomers include vinyl acetate, propyl vinyl acetate, vinyl propionate, vinyl valerate, propenyl acetate, methyl acrylate, butyl acrylate, isobutyl acrylate, methyl methacrylate, isobutyl methacrylate, butyl methacrylate, styrene, methyl styrene, 3-chloro-4-methyl styrene, alpha-methyl styrene, vinyl chloride, and 2-chloropropene. The preferred vinyl monomer is vinyl acetate.

The presence of the high molecular weight acrylic ester monomers in the copolymer imparts internal plasticization which softens the films prepared from the copolymer and promotes the fusibility of the particles in the coating composition. By employing the selected high molecular weight acrylic ester monomers of this invention is preparing the copolymers, films having lower brittle points than the corresponding n-alkyl acrylates and improved water absorption qualities are produced.

The weight ratio of the high molecular weight acrylic ester to the low molecular weight vinyl compound in preparing the copolymers can vary over a wide range. In general, the higher the ratio of ester to vinyl compound, the more flexible the resulting films. The weight ratio of ester to vinyl compound can vary from 1:1 to 1:99 with the preferred ratios dependent upon the desired qualities of the resulting films.

The copolymers which are utilized to form the compositions of this invention should have a weight average molecular weight of at least 2000. The preferred weight average molecular weight of the copolymers can be between 2000 and 400,000 with more preferred weight average molecular weights between 10,000 and 100,000. These weight average molecular weights are measured by the method of intrinsic viscosity referred to above.

The selected acrylic ester polymers or copolymers of this invention may be prepared in any suitable manner. The preferred manner of preparation depends primarily on the final coating composition which is desired. For example, the coating compositions of this invention can be either solutions of the selected polymers or copolymers in an inert volatile carrier, such as toluene, or the coating compositions can be an emulsion of the selected polymers or copolymers in an inert volatile carrier, such as water. Since the re-solution or emulsification of the dry formed polymers or copolymers is difficult, it is preferred that the polymers or copolymers be formed in the presence of the inert volatile carrier which is intended to form at least a portion of the final coating composition.

One satisfactory polymerization process comprises the polymerization or copolymerization of high molecular weight acrylic esters having the general formula:

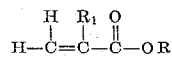

where R and R$_1$ are as defined above for the acrylic ester polymers, by means of a free radical producing catalyst. For example, one suitable type of free radical producing catalyst is a peroxide type material which can be represented by the general formula:

where R″ and R‴ can be the same or different and can be hydrogen; alkyl groups, such as tertiary-butyl, octyl, lauryl, and secondary-butyl; cycloalkyl groups, such as cyclohexyl, cyclobutyl, cyclooctyl; or aryl groups, such as benzyl, phenyl, cumyl, 2,4-dichlorophenyl and p-chlorophenyl. Other suitable catalysts include inorganic peroxides, such as ammonium or potassium persulfates and cyclohexyl persulfonic acid; and organic materials such as ketone peroxides, for example, methyl ethyl ketone peroxide, and azonitriles, such as azobisisobutyronitrile.

The free radical producing catalyst can be employed in a concentration of about 0.1 to about 6 weight percent based on the weight of the monomer. The term monomer includes the high molecular weight acrylic ester and the low molecular weight vinyl compound if employed. The preferred concentration of the free radical producing catalyst is between about 0.5 and 3 weight percent based on the weight of the monomer.

The free radicals are usually produced from the catalyst, for example from the organic and inorganic peroxide by a thermal type reaction. The various organic and inorganic peroxides, however, vary in their thermal stability to form free radicals. It is, therefore, sometimes necessary or desirable to employ an accelerator in order to employ reasonable polymerization reaction temperatures. These accelerators function as reducing agents which act to form the free radicals from the organic and inorganic peroxides at more moderate temperatures. This type of catalyst system is commonly called a redox system. Suitable accelerators include the alkaline metal and ammonium bisulfites, metabisulfites, and thiosulfites, in addition to any salt which will give a ferrous ion in solution. Examples of suitable salts include ferrous sulfate and ferrous chloride.

It is preferred to employ an amount of accelerator just sufficient to reduce the peroxide to form the free radicals, and this amount can be determined from the oxidation-reduction equations.

Although a reaction solvent is not necessary, it is preferred that a reaction solvent be employed. A reaction solvent can be any non-polymerizing inert liquid. However, as noted above, it is preferred that the reaction solvent be the inert volatile carrier which is intended to form at least a portion of the final coating composition. It is also preferred that the reaction solvent be miscible or emulsifiable with the reactants and products. The inert volatile carriers which can be employed as reaction solvents are defined more generally hereinafter. Examples of suitable inert reaction solvents include water; oxygenated hydrocarbons, such as esters or ketones; and liquid aromatic hydrocarbons, such as benzene, toluene and the xylenes. The amount of reaction solvent can be from about 1 to about 50 volume per each volume of monomer.

Any polymerization pressure can be employed. Thus, pressures from atmospheric or below to 1000 p.s.i.g. or higher can be employed. Atmospheric pressure is, of course, preferred. Any polymerization temperature can be employed so long as the reactants are maintained in the liquid phase, the catalyst is decomposed to form free radicals, and neither the solvent or monomers are thermally decomposed. Thus, the lower limit of the reatcion temperature is determined by the freezing point of the reactants while the upper temperature is limited by the vaporization temperature of the reactants or solvent under the reaction pressure employed or the thermal decomposition point of the reactants or solvent. In general, reaction temperatures between about 0° C. and about 150° C. have been found to be suitable. Preferred reaction temperatures are between 35° and 100° C.

The reaction time should be sufficient to produce the acrylic ester polymer or copolymer within the desired molecular weight range. The reaction time will depend upon a number of reaction variables including the type of catalyst employed, the reaction temperature, and the catalyst concentration. It has been found, for example, that a thirty-minute reactions time is suitable at a reaction temperature of 95° C. when polymerizing a $C_{13}$ oxo alcohol acrylate in the presence of hydrogen peroxide as a catalyst, water as the reaction solvent, and a surfactant comprising cetyldimethylbenzyl ammonium chloride. In general, however, reaction times of less than about five minutes are unsatisfactory because there is not sufficient time for the desired polymers to be produced. Reaction times above about 10 hours are not desirable since the products would be too high in molecular weight. The reaction time can, therefore, vary between about 5 minutes and 10 hours with preferred reaction times between 0.5 and 5 hours.

When water is employed as the reaction solvent, it is also necessary to employ a surfactant to emulsify the monomers and acrylic ester polymers and copolymers with the reaction solvent and promote what is called an emulsion type polymerization. In an emulsion type polymerization, any buffer well known in the art, such as sodium bicarbonate can be used to control the pH of the reaction mixture to 7 or above. It is preferred that the water employed be as pure as possible, distilled or deionized water being suitable. The presence of impurities in the water may tend to react with or precipitate the surfactants.

Any suitable surfactant can be employed. A surfactant can be defined broadly as a molecule containing both a hydrophobic group and a hydrophilic group. The surfactant lowers the interfacial tension between the water and the monomers and polymers so that a dispersion of the monomers and polymers in the water is obtained. By a "dispersion" is meant a colloidal suspension or emulsion, the dispersed particles of which possess an average diameter in the range of about ten millimicrons to ten microns. The surfactant may be anionic, cationic, nonionic or amphoteric. Suitable anionic surfactants include, for example, carboxylic acid salts such as, for example, sodium stearate, potassium laurate, monoethanolamine palmitate, and triethanolamine stearate; and organic sulfuric and sulfonic acid ester salts such as, for example, sodium dodecylbenzene sulfonate; sodium lauryl sulfate; and sodium ethoxylated tridecyl sulfate. Suitable cationic surfactants include, for example, amine salts; quaternary ammonium salts; and the amino amides and imidazolines. Examples of cationic agents are 1-hydroxyethyl-2-heptadecenyl glyoxalidene hydrochloride; hexadecyl morpholinium ethoxy sulfate and octadecyl dimethyl benzyl ammonium chloride. Suitable nonionic surfactants include, for example, ethoxylated alkylphenols, alcohols, mercaptans, acids and amines; the alkyl and alkyl aryl ethers and thioethers; esters and amides. Examples of nonionic surfactants include polyethylene glycol tert-dodecylthioether; lauric, palmitic, stearic and oleic acid esters of sorbitol; sorbitol poly(ethylene oxide)lauric, palmitic, stearic, and oleic acid esters; and lauryl ethers of polyethylene oxide. A suitable example of an amphoteric surfactant is alpha-amino lauric acid. It is preferred that the surfactants be selected from the group consisting of the anionic and nonionic surfactants. The most preferred surfactants are the carboxylic acid salts, organic sulfuric and sulfonic acid salts, and the nonionic ethoxylated alkylphenols. Mixtures of surfactants can also be employed.

The amount of surfactant to be employed is usually sufficient to form a dispersion of the monomers, selected polymers or copolymers in the water. The exact amount of surfactant to be employed will, of course, be a function of the particular surfactant used, the particular materials which are to be dispersed, and the amount of water in the reaction mixture. In general, the amount of surfactant to be employed will vary from about 0.2 to 20 weight percent based on the total reaction mixture with preferred amounts of surfactant between 1 and 5 weight percent.

The acrylic ester monomer which can be employed to produce the acrylic ester polymers for use in the coating compositions of this invention comprises those acrylic ester monomers having the general formula:

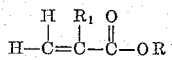

where R and $R_1$ are as defined above for the acrylic ester polymers, that is, where $R_1$ is selected from the group consisting of hydrogen and $CH_3$ and R is a saturated alkyl radical having between 10 and 16 carbon atoms. The preferred acrylic ester monomers are those wherein $R_1$ is hydrogen and R is a branched chain saturated alkyl radical having between 10 and 16 carbon atoms. Suitable examples of acrylic ester monomers which can be employed include 2-methyl nonyl acrylate; 3-ethyl octyl methacrylate; 2,4,6-trimethyl heptyl acrylate; 4,6-dimethyl octyl acrylate; 2-isopropyl-3-ethyl pentyl methacrylate; 2-ethyl-3, 5-dimethyl hexyl acrylate; 2-methyl dodecyl acrylate; 4-ethyl dodecyl methacrylate; 3-isopropyl undecyl acrylate; 2,4,6,8-tetramethyl nonyl acrylate; and 2,4,6,8,10-pentamethyl undecyl acrylate.

The acrylic ester monomers can be prepared by any suitable process. One satisfactory esterification process comprises the reaction of an unsaturated monocarboxylic acid selected from the group consisting of acrylic and methacrylic acids with at least one alcohol selected from the group consisting of saturated aliphatic alcohols having between 10 and 16 carbon atoms per molecule.

Any suitable method can be employed to promote the reaction of the acrylic and methacrylic acids with the aliphatic saturated alcohols to produce the desired ester monomers. For example, one suitable method involves reacting the acid and alcohol in the presence of a suitable esterification catalyst, for example, p-toluene sulfonic and sulfuric acid. The reaction temperature can vary over a wide range, for example, the esterification reaction temperature can be between 50° and 270° C. with preferred temperatures between 100° and 180° C. The reaction pressure is not critical and can vary from atmospheric or below to 100 p.s.i.g. or higher. Atmospheric pressure is preferred. The reaction time will depend on the catalyst, catalyst concentration and reaction temperature, but generally reaction times between 1 and 10 hours are suitable. The catalyst concentration is not critical and can vary generally from 0.2 to 5 weight percent of the alcohol charge stock. The mole ratio of the acrylic or methacrylic acid to the saturated aliphatic alcohol can be between 5:1 and 1:1 with preferred mole ratios between 1.5:1 and 1.1:1.

As noted above, the acid portion of the high molecular weight acrylic ester monomer comprises acrylic and methacrylic acid which can be represented by the general formula:

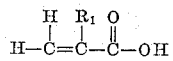

where $R_1$ is as defined above, that is, where $R_1$ is selected from the group consisting of hydrogen and $CH_3$.

The alcohols which can be employed to produce the high molecular weight acrylic ester monomers defined above comprise those saturated aliphatic alcohols having between 10 and 16 carbon atoms per molecule. It is preferred that the alcohols have between 11 and 16 carbon atoms per molecule. Since it is one of the features of this invention that the acrylic ester polymers have dependent ester radicals wherein at least half of said ester radicals have a branched-chain structure, at least half of the alcohols must have a branched-chain structure. It is additionally preferred that the alcohols be as mixture of branched-chain isomers rather than a single branched-chain isomer. Suitable examples of alcohols which can be employed include 2-methyl nonanol-1; 3-ethyl octanol-1; 2,4,6-trimethyl heptanol-1; 4,6-dimethyl octanol-1; 2-isopropyl-3-ethyl pentanol-1; 2-ethyl-3,5-dimethyl hexanol-1; 5,7-dimethyl octanol-1; 2-methyl dodecanol-1; 2-ethyl dodecanol-1; 3-isopropyl undecanol-1; 2,4,6,8-tetramethyl nonanol-1; and 2,4,6,8,10-pentamethyl undecanol-1.

The alcohols for use in forming the acrylic ester monomers defined above can be obtained by any suitable procedure. Since at least half of the alcohols must have a branched chain structure, it is preferred that the alcohols be obtained by the hydroformylation of olefins having between 9 and 15 carbon atoms per molecule. It is reported (see "Higher Oxo Alcohols" by Lewis F. Hatch; John Wiley & Sons, Inc., page 6), that, in general, there are obtained from 60 to 40% branched-chain alcohols from the hydroformylation of straight-chain olefins regardless of the number of carbon atoms in the straight-chain olefin. The hydroformylation reaction can be operated by methods well known in the art, such as those described, for example, in U.S. Patents 2,748,168 and 2,743,302. In the hydroformylation reaction the olefin is reacted in the presence of carbon monoxide and hydrogen to form a saturated aldehyde having one more carbon atom than the original olefin. The catalyst, for example, can be any cobalt compound or cobalt itself, supported or unsupported. Preferred catalysts are the hydrocarbon soluble cobalt salts of aliphatic carboxylic acids having from 8 to 16 carbon atoms. Examples of suitable catalysts include cobalt naphthenate and cobalt octanoate. The hydroformylation reaction generally occurs at a temperature between 110° and 200° C. and increased pressures of between 1500 and 4500 p.s.i.g. The hydrogen to carbon monoxide weight ratio will normally be about 1:1, although ratios between 0.8:1 and 5:1 can be employed. The hydroformylation reaction products are normally decobalted and then hydrogenated.

The hydrogenation of the decobalted hydroformylation reaction products can occur by any suitable method. One satisfactory method is to contact the aldehyde with a solid hydrogenation catalyst in the presence of hydrogen under conditions suitable for the conversion of aldehydes to alcohols. Any suitable hydrogenation catalyst can be employed, such as the supported or unsupported metals from Groups VI and VIII of the Periodic Table, their oxides and sulfides. Typical hydrogenation reaction conditions include temperatures between 300° and 500° F., pressures between 100 and 1000 p.s.i.g., or higher, and liquid hourly space velocities between 0.25 and 10, or higher.

It is preferred that the olefin charge stocks to the hydroformylation reaction contain between 10 and 15 carbon atoms per molecule and it is still more perferred that the olefins have a branched chain structure. The olefins can be obtained from any suitable source, such as the polymerization of light olefins, such as propylene, or the more recent telemerization process, such as that described in "Annalen die Chemie" 629, 1–256 (1960). Mixtures of olefins may also be employed. Specific examples of suitable olefins include tetrapropylene; 4-ethyl-3-heptene; 2,4-dimethyl-2-octene; tri-isobutylene; 3-methyl-3-dodecene; and tetradecene-1.

The preferred process for obtaining the olefin charge stocks for the hydroformylation reaction is by the controlled polymerization of light olefins, such as alpha mono-olefins having between two to four carbon atoms per molecule. The preferred alpha mono-olefin is propylene. Any suitable method can be employed to polymerize the alpha mono-olefins. One suitable method comprises contacting the alpha mono-olefin with a polymerization catalyst such as phosphoric acid on kieselguhr at a temperature between 350° and 450° F., a pressure between 350 and 600 p.s.i.g., and at a space velocity between 0.1 and 0.2 gallon of feed per hour per pound of catalyst. The reaction product from the olefin polymerization process is fractionated to yield mixtures of olefins having the desired number of carbon atoms per molecule.

The reaction product from the homo or copolymerization of the acrylates comprises the polymer or copolymer, catalyst and reaction solvent, if employed. If a reaction solvent suitable as an inert volatile carrier were employed in the proper amount in the polymerization reaction, the reaction product from the polymerization process can be used directly as a coating composition.

The selected acrylic ester polymers or copolymers defined above which are to be utilized in the coating compositions of this invention are not suitable as coating compositions per se due to their tackiness and high viscositiy which makes spreading the polymers over the base surfaces to be coated so difficult as to be unfeasible. It is, therefore, necessary that the selected acrylic ester polymers and copolymers defined above be dispersed in a carrier. The function of the carrier is to aid in dispersing the selected polymers over the surface to be coated. It is also necessary that the carrier be a volatile carrier in order than the coating composition is capable of forming films, that is, the properties of the carrier must be such that the carrier will, after the coating composition is applied to the surface to be coated, substantially all vaporize under atmospheric conditions in a reasonable length of time of less than about two hours. It is also necessary that the volatile carrier be inert. A volatile carrier is inert when it does not substantially react with the polymers or with the base surfaces to be coated.

The volatile carrier utilized in the coating compositions of this invention comprises any inert material, organic or inorganic, which boils at a temperature between about 35° and about 160° C. and preferably at a temperature between 50° and 140° C. at atmospheric pressure, and which forms and remains a stable blend with the selected acrylic ester polymers and copolymers defined above. By a stable blend is meant a macroscopically substantially homogeneous mixture of the components of the blend. The stable blend can be either a solution, a gel, or an emulsion of the selected polymers and the volatile carrier.

The selected acrylic ester polymers and copolymers of this invention are substantially soluble with esters, ketones and aromatics but have only limited solubility in alcohols and aliphatic hydrocarbons. One preferred type of carrier, therefore, is an organic material selected from the group consisting of esters, ketones and aromatics and which boils at a temperature between 50° and 160° at atmospheric pressure. The most preferred organic material is an aromatic or mixture of aromatics having a boiling range between 80° and 160° C. Suitable examples of inert volatile organic carriers include benzene; toluene; ortho, meta and para-xylenes; ethyl acetate; methyl ethyl ketone and Cellosolve acetate.

When at least a portion of the inert volatile carrier is water, a surfactant is a necessary component of the volatile carrier so that a stable emulsion can be formed which is macroscopically homogeneous.

Mixtures of various inert volatile carriers may also be employed so long as macroscopically homogeneous and stable blend is formed with the selected acrylic ester polymers and copolymers defined above. Examples of suitable blends include methyl ethyl ketone-Cellosolve acetate; toluene-Cellosolve acetate; and toluene-methyl ethyl ketone.

As noted above, it is very difficult to re-dissolve or emulsify the acrylic ester polymers and copolymers of this invention once they are formed. It is, therefore, preferred to employ as the reaction solvent at least a portion of the inert volatile carrier which is intended to be a part of the final coating composition. If the acrylic ester polymers or copolymers of this invention are not dissolved or emulsified as they are formed in at least a portion of the inert volatile carrier which is to form part of the final coating composition, then the separated acrylic ester polymers or copolymers which are solids or very viscous liquids must, in order to be blended with the inert volatile carrier to form the coating compositions of this invention, be first dissolved to form a solution in an organic carrier and then emulsified, if desired, with water and a surfactant. Consequently, if a completely water-based coating composition is desired, it is necessary that an emulsion-type polymerization be employed.

The proportion of the acrylic ester polymers or copolymers blended with the volatile carrier can vary over a wide range depending on the desired properties, particularly the viscosity, of the final coating composition. Thus, coating compositions ranging from aqueous or nonaqueous, liquids, creams, or even more viscous materials can readily be formulated by those having the skill in this art. The amount of polyester in the final coating composition can vary from about 10 to 90 percent by weight of the final coating composition. The specific proportion required will depend upon a number of factors, i.e., the specific polyester employed, the exact nature of the inert volatile carrier, and the type of product, that is, the viscosity of the product which is desired.

*Example 1*

A mixture of olefins having 12 carbon atoms per molecule was obtained by the polymerization of propylene using a supported phosphoric acid on kieselguhr catalyst at a temperature of about 400° F., a pressure of about 550 p.s.i.g. and a space velocity of about 0.15 to 0.2 gallons of propylene per hour per pound of catalyst. The total propylene polymer was fractionated to yield, among others, a tetrapropylene fraction having the inspections as given in Table I below.

TABLE I

| Inspections: | Propylene tetramer |
|---|---|
| Gravity, ASTM D287 | 0.7720 |
| Carbon number, by mass spectrometer, percent by vol.: | |
| Monoolefine— | |
| $C_{11}$ | 15 |
| $C_{12}$ | 80 |
| $C_{13}$ | 3 |
| Diolefins | 2 |
| Distillation: | |
| Initial boiling point, ° C. at 760 mm. | 187.3 |
| 10% point, ° C. at 760 mm. | 189.4 |
| 50% point, ° C. at 760 mm. | 190.8 |
| 95% point, ° C. at 760 mm. | 194.5 |
| Dry point, ° C. at 760 mm. | 207.2 |
| Infrared olefin type analysis, mol percent: | |
| $RCH=CH_2$ | 1.7 |
| $RCH=CHR$ | 13.8 |
| $R_2C=CH_2$ | 9.3 |
| $R_2C=CHR$ | 37.4 |
| $R_2C=CR_2$ | 37.8 |

The infrared analysis shows that 74.5 mole percent of the olefin product was branched-chain in structure.

These olefins were subjected to hydroformylation at 360° F., 3500 p.s.i.g. using 0.1–0.5% of a cobalt octanoate catalyst for about one hour. The product from the hydroformylation reaction was decobalted and subjected to hydrogenation at 350° F. 1000 p.s.i.g. by passage through a bed of a hydrogenation catalyst comprising 45% cobalt as the oxide on a silica-alumina base at a liquid hourly space velocity of about 0.75.

The properties of the mixture of $C_{13}$ alcohols (tridecyl alcohol) are given in Table II below.

TABLE II

| Inspections: | |
|---|---|
| Gravity, ASTM D268, Sp. Gr. 20/20° C. | 0.8449 |
| Viscosity, ASTM D445, 20° C., cs. | 48.55 |
| Refractive index, GRM 2413, $n_D^{20}$ | 1.4476 |
| Alcohol content, percent by weight | 100.0 |
| Distillation, ASTM D1078— | |
| Overpoint, ° C. at 760 mm. | 252.5 |
| Dry point, ° C. at 760 mm. | 261.5 |
| 50% point, ° C. at 760 mm. | 255.5 |

A portion (1766 grams, 8.0 moles) of the tridecyl alcohol mixture was placed into a glass reactor with 1081 grams (15.0 moles) of glacial acrylic acid, 38.1 grams (2 mole percent) p-toluene sulfonic acid, 75 grams hydroquinone (3.3% based on the ester) and 150 cc. of benzene azeotroping agent. The reaction time was 5 hours at 100–160° C. The water of esterification was removed as the benzene-water azeotrope. The product was washed with water to remove the excess acrylic acid. The product was washed with a 5% sodium bicarbonate solution until the washings were basic. The product was then water washed to remove excess base. The water and benzene were distilled overhead from the washed product at atmospheric pressure while a stream of $CO_2$ was bubbled through the system. The remaining product was distilled under a vacuum of 10 mm. at 141–154° C. to give 1730 grams (77% yield) of a mixture of tridecyl acrylates having the properties given in Table III below.

TABLE III

| | Tridecyl Acrylate | Decyl Acrylate |
|---|---|---|
| Specific Gravity, 20/20° C | 0.8849 | 0.8842 |
| Refractive Index, $n_D^{20}$ | 1.4482 | 1.4414 |
| Distillation Range, ° C./10 mm.: | | |
| First Drop | 141.0 | 113.0 |
| Main Fraction: | | |
| 5% | 143.0 | 116.0 |
| 95% | 151.0 | 123.0 |
| Last Drop | 154.0 | 124.0 |
| Carbon: | | |
| Actual | 75.88 | 74.98 |
| Theory | 75.53 | 73.53 |
| Hydrogen: | | |
| Actual | 11.50 | 11.20 |
| Theory | 11.92 | 11.39 |
| Acrylate Content, percent: | | |
| (a) By Hydrogen No | 93.0 | 99.0 |
| (b) By Saponification No | 103.0 | 97.0 |

Twenty-five grams of the tridecyl acrylate were emulsion polymerized using 50 grams of water as solvent, 0.25 gram of cetyldimethylbenzyl ammonium chloride as the surfactant and 5.0 grams of hydrogen peroxide (30%) and 0.1 gram of benzoyl peroxide as the catalysts at 95–100° C. for a one-half hour reaction period. The homopolymer was washed with water and dried for one-half hour at 140° C. and less than 1 mm. pressure to remove unreacted monomer. The brittle point of the acrylic ester homopolymer was −43.7° C. The brittle point of a normal tridecyl acrylate is +12° C.

Example 1 above shows the unexpectedly low brittle point of the tridecyl acrylate polymer which has at least a 50% branched structure in the alcohol portion compared to the brittle point of the n-tridecyl acrylate polymer.

*Example 2*

Example 1 was repeated except a mixture of olefins having 9 carbon atoms per molecule which was obtained by propylene polymerization was subjected to hydroformylation and hydrogenation to produce a mixture of $C_{10}$ alcohols. The properties of the mixture of decyl alcohols are given in Table IV below.

TABLE IV

Inspections:
Gravity, ASTM D268, Sp. Gr. 20/20° C. __ 0.8376
Viscosity, ASTM D445, 20° C., cs. _____ 20.55
Refractive index, $n_D^{20}$ _____ 1.4388
Alcohol content, percent by weight $C_{10}$ alcohol _____ 100.00
Distillation, ASTM D1078—
Overpoint: ° C. at 760 mm. _____ 215.8
Dry point: ° C. at 760 mm. _____ 222.8
50% point: ° C. at 760 mm. _____ 217.1

The decyl alcohols were reacted with glacial acrylic acid as in Example 1 to produce a decyl acrylate whose properties are given in Table III above.

The decyl acrylate was emulsion polymerized as in Example 1. The brittle point of the acrylic ester homopolymer was —40° C. which was unexpectedly as low as the brittle point of the n-decyl acrylate homopolymer.

A series of emulsion polymerization runs were made to prepare copolymers of n-hexyl, 2-ethylhexyl, decyl and tridecyl acrylates with vinyl acetate. The properties of the decyl and tridecyl acrylates are given in Table III above. The properties of the n-hexyl and the 2-ethylhexyl acrylates are given in Table V below, as well as the properties of vinyl acetate.

TABLE V

| Inspections | Acrylate Ester | | Vinyl Acetate b |
|---|---|---|---|
| | Hexyl | 2-ethyl-hexyl a | |
| Specific Gravity, 20/20° C | 0.8890 | 0.8830 | 0.9338 |
| Refractive Index, $n_D^{20}$ | 1.4277 | 1.4352 | 1.3952 |
| | ° C./ 30 mm. | ° C./ 15 mm. | ° C./ 760 mm. |
| Distillation Range: | | | |
| First Drop | 88.8 | 98.0 | 72 |
| Main Fraction: | | | |
| 5% | 89.0 | 100.0 | |
| 95% | 92.5 | 102.5 | |
| Last Drop | 93.0 | 104.0 | 73 |
| Carbon: | | | |
| Actual | 69.53 | | |
| Theory | 69.19 | | |
| Hydrogen: | | | |
| Actual | 10.44 | | |
| Theory | 10.32 | | |
| Acrylate Content, percent: | | | |
| (a) By Hydrogen No. | 98 | | |
| (b) By Saponification No. | 97 | | |
| (c) By Bromination | | | 98.0 | a Commercial Product—Celanese Corporation of America.
b Commercial Product—Celanese Corporation of America—H Grade.

Copolymers were prepared containing 5, 10, 15 and 20 weight percent of the acrylate in the copolymer. The procedure in the preparation of all of the copolymers was as follows:

A mixture of 556.4 total grams (55.64 weight percent) of the desired acrylate and vinyl acetate, and 3.3 grams (0.33 weight percent) of ammonium persulfate (the catalyst) was added over a four hour period with sufficient stirring to obtain a homogeneous emulsion to 415.3 grams (41.53 weight percent) of distilled water maintained at a temperature of 78–80° C. which contained a buffer, three surfactants and a protective colloid. Sodium bicarbonate was used as the buffer in the amount of 2.5 grams. The surfactants were 8.0 grams (0.80 weight percent) of an alkyl aryl sodium sulfonate (marketed as Santomerse #3 Paste by Monsanto); 6.0 grams (0.60 weight percent) of an ethoxylated octyl phenol containing between 9 and 10 moles of ethylene oxide (marketed by Rohm & Haas as Triton X-100); and 3.0 grams (0.30 weight percent) of an ethoxylated nonyl phenol containing four moles of ethylene oxide (marketed by Union Carbide as Tergitol NP-14). The protective colloid (5.5 grams) was an hydroxy ethyl cellulose having a viscosity of 70 to 110 centipoises in a five percent concentration in water at 20° C. (marketed by Union Carbide as Cellosize WP-09). The reaction mixture was then heated for an additional half hour at 90–92° C.

Portions of the various copolymers were extracted from the reaction mixtures and the intrinsic viscosities of these copolymers were obtained by disolving the copolymers in acetone and proceeding by the method described in the Flory reference noted above. The intrinsic viscosities of all of the copolymers were between 0.4 and 0.5 deciliter per gram which corresponds to a weight average molecular weight of about 50,000.

Films were made from the emulsion by (1) placing 10 mls. of the emulsion at the top of a level melamine coated paper free of surface scratches and cleaned with acetone and held in place by a vacuum plate, and (2) drawing down the film at a uniform rate using a Bird applicator set at 0.006 inch (6 mils). This operation was performed in a room where the temperature was maintained at 73°±1° F. and the relative humidity was 50 percent.

The percent water absorbed by the films was determined by immersing a dry film in water held at room temperature for 24 hours and thereafter determining the weight of water absorbed by the difference in weights of the dry and wet films.

The figure attached is a plot of the weight percent water (based on the weight of the film) absorbed versus the percent acrylate ester content of the copolymer. The 2-ethylhexyl, a $C_8$ ester, had a higher percent of water absorption than the n-hexyl acrylate copolymer films at all concentrations of acrylate ester. It was expected therefore that the $C_{10}$ and $C_{13}$ acrylate copolymers would have still higher percentages of water absorption. It was found that the copolymers of the decyl acrylate and particularly the tridecyl acrylate had unexpectedly low percentages of water absorbed as shown on the attached figure. A low percentage of water absorbed is a particularly valuable property of certain coating compositions, especially water-based paints for the films produced from these coating compositions will have improved scrub resistance, that is, they can be water washed for longer periods without the paint dissolving away.

It is understood that various additions and modifications may be made to the coating compositions within the scope of the invention, for example, oxidation inhibitors may be added to retard degradation or undesired discoloration of the coating compositions. Cellulose thickeners, such as carboxymethyl cellulose may be added if desired, as well as antifoam agents. A pigmented coating composition may be desired and thus pigments such as, for example, titanium dioxide, phthalocyanines, chromium oxides, cadmium yellow, lampblack and zinc oxide for antifungicidal activity can be added.

The acrylic ester polymer and copolymer coating compositions may be blended with other components, for example, with chemical plasticizers, such as dibutyl phthalate, dibutyl sebacate, tricresyl phosphate and chlorinated biphenyls. The emulsion-type coating compositions are usually low in viscosity and agents known as "protective colloids" are added to aid in stabilizing the emulsions. These agents include materials such as casein, alginates, polyvinyl alcohol, sodium polyacrylate, methyl cellulose and hydroxyethyl cellulose. These materials are, however, water dispersible and since they remain in the film after the emulsion is applied and dried, they tend to reduce the water resistance of the film. It is another advantage of the present invention, therefore, that the films have improved water resistance which tends to offset the effect of the protective colloids.

In other words, the addition of various thickeners, preservatives and modifiers as practiced by those having skill in the coating composition art is contemplated, and such

We claim:
1. A liquid coating composition comprising an inert volatile carrier which boils at a temperature between about 35° and about 160° C. at atmospheric pressure, and between 10 and 90 weight percent of said coating composition of a polymer of an ester monomer having the general formula:

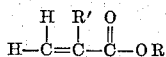

where R' is selected from the group consisting of hydrogen and $CH_3$; R is a saturated alkyl radical derived from a primary alcohol having between 10 and 16 carbon atoms, and where at least one-half of said R radicals have a branched-chain structure, said polymer having a molecular weight of between 2,000 and 400,000 and a brittle point between −20° C. and −50° C.

2. A liquid coating composition comprising an inert volatile carrier which boils at a temperature between about 35° and about 160° C. at atmospheric pressure and between 10 and 90 weight percent of said coating composition of a polymer of an ester monomer, said polymer having a weight average molecular weight of between 2000 and 400,000 and a brittle point of between −20° and −50° C., said ester monomer comprising the reaction product of an unsaturated organic acid selected from the group consisting of acrylic and methacrylic acid and at least one alcohol having between 10 and 16 carbon atoms, and said alcohol comprising the reaction product of the hydroformylation and hydrogenation of olefins having between 9 and 15 carbon atoms per molecule, wherein at least 17 weight percent of said olefins have a branched chain structure.

3. A coating composition according to claim 2 wherein the olefins to said hydroformylation and hydrogenation reaction are substantially all branched-chain in structure.

4. A liquid coating composition comprising an inert volatile carrier which boils at a temperature between about 35° and 160° C. at atmospheric pressure and between 10 and 90 weight percent of said coating composition of a copolymer of vinyl acetate and an acrylic ester monomer comprising the reaction product of an unsaturated organic acid selected from the group consisting of acrylic and methacrylic acid and at least one alcohol having between 10 and 16 carbon atoms, said alcohol comprising the reaction product of the hydroformylation and hydrogenation of olefins having between 9 and 15 carbon atoms per molecule, and wherein at least one-half of said alcohols have a branched-chain structure, the weight ratio of said acrylic ester monomer to said vinyl acetate in said copolymer being between 1:1 and 1:99, and said copolymer having a molecular weight of between 2,000 and 400,000.

5. A composition according to claim 4 wherein the inert volatile carrier is water and the low molecular weight vinyl compound is vinyl acetate.

6. A composition according to claim 4 wherein the low molecular weight vinyl compound is vinyl acetate and the alcohol comprises the reaction product of the hydroformylation and hydrogenation of tetrapropylene.

References Cited by the Examiner

UNITED STATES PATENTS

| 2,743,302 | 4/1956 | Gwynn et al. | 260—638 |
| 3,012,017 | 12/1961 | Lindstrom | 260—86.7 |
| 3,067,154 | 12/1962 | Sterling | 260—89.5 |

OTHER REFERENCES

Fieser et al.: Organic Chemistry, copyright 1950, by D.C. Heath and Co., page 199. (Copy in Group 140.)

JOSEPH L. SCHOFER, *Primary Examiner.*

D. E. CZAJA, *Examiner.*

H. WONG, *Assistant Examiner.*